Figure 3:
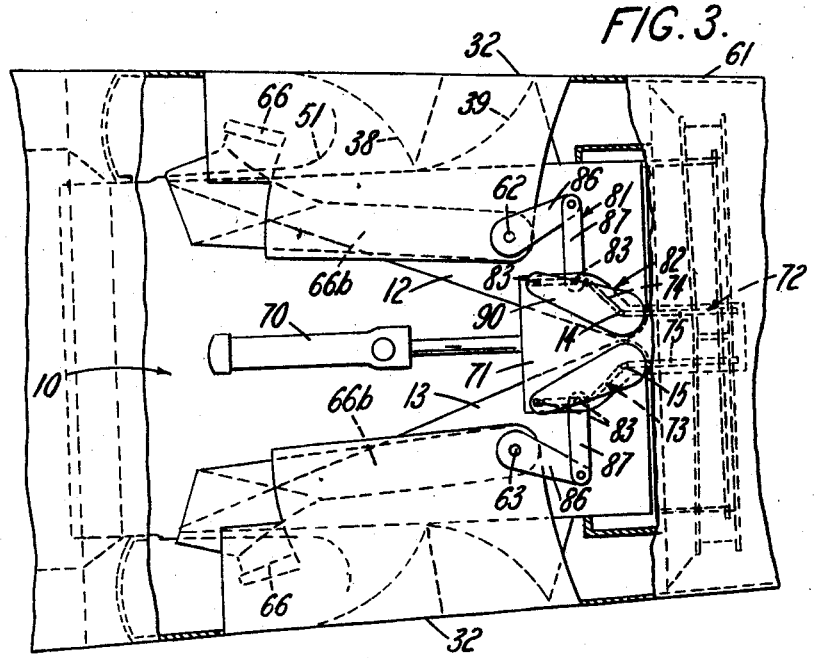

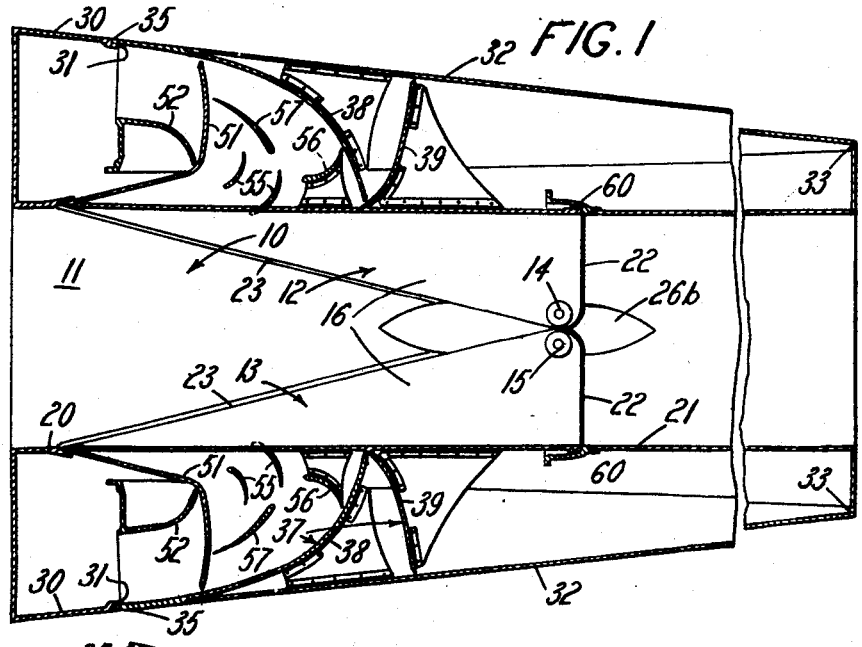

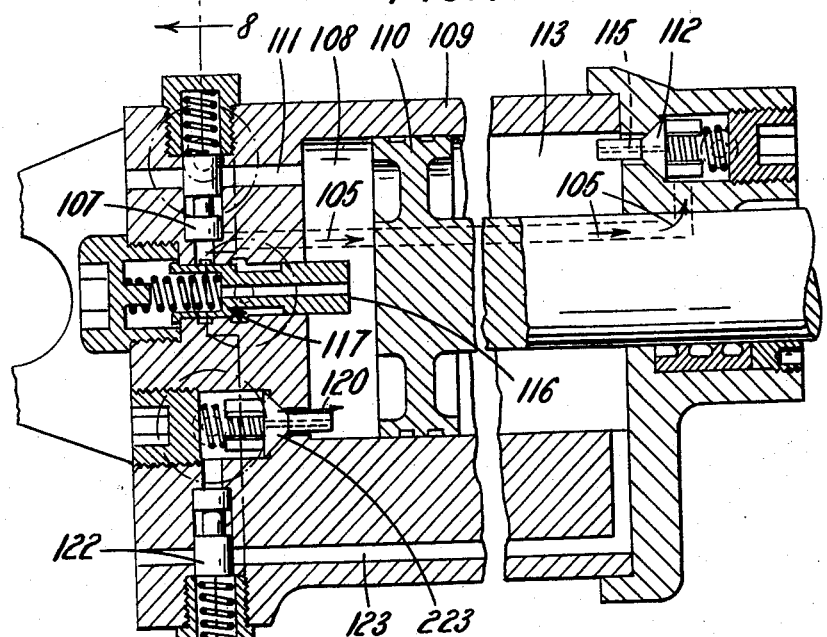
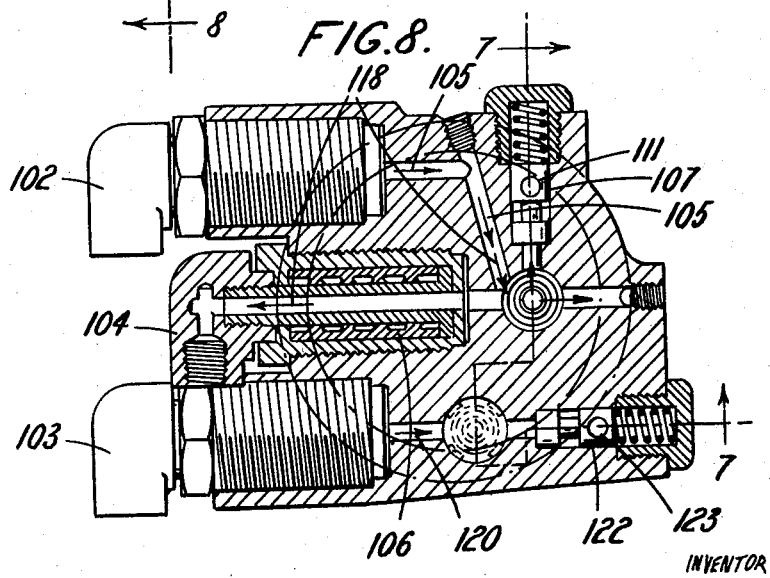

July 12, 1960 E. P. PEREGRINE 2,944,394
JET ENGINE THRUST REVERSER
Filed May 16, 1955 6 Sheets-Sheet 6

INVENTOR
E. P. PEREGRINE
By Wilkinson & Mawhinney
ATTYS.

United States Patent Office 2,944,394
Patented July 12, 1960

2,944,394

JET ENGINE THRUST REVERSER

Edgar Phillips Peregrine, Royston, England, assignor, by mesne assignments, to Bristol Aero Engines Limited, Bristol, England, a British company Filed May 16, 1955, Ser. No. 508,637

Claims priority, application Great Britain May 21, 1954

17 Claims. (Cl. 60—35.54)

This invention relates to valve means for closing a tubular duct.

According to the invention the valve means comprises a plurality of impervious valve members hingeably mounted in the duct about axes lying in a plane normal to the long axis of the duct, the hinge axis of each valve member intersecting the wall of the duct at at least two points, each valve member having an internal surface of the same shape as part of the internal surface of the wall of the duct and being hinged so as to be capable of moving between an open position in which its internal surface forms a faired continuation of the internal wall of the duct to a closed position in which it extends into the duct, the valve members being so shaped that when moved between their open and closed positions, a first part of the periphery of each valve member remains substantially contiguous with the internal surface of the wall of the duct, said first parts of the peripheries of the valve members together extending substantially around the whole of the periphery of the cross-section of the duct, and so that at least part of the remainder of the peripheries of the valve members in the closed position of the valve members butt together and form a closure across the duct, and valve member moving means for moving said valve members between their open and closed positions.

The duct to be closed by a valve means as just defined is preferably, but not necessarily, continuously curved in cross-section at least in the region of the valve means such that the whole of the wall of the duct is concave considered from a longitudinal axis in the duct and such that the duct presents in cross-sections a shape which has an axis of symmetry intersecting the long axis of the duct, the maximum cross-sectional dimension of the duct parallel with the axis of symmetry at each cross-section lying along the axis of symmetry at the cross-section, in which case the valve means may comprise, according to a feature of the present invention, two valve members each of which has said first part of its periphery lying in a plane which intersects a plane containing at least said part of the remainder of its periphery at a line parallel to a cross-sectional axis of symmetry of the duct, the planes containing said first parts of the peripheries of the valve members being arranged substantially normally to the long axis of the duct and said planes containing at least part of the remainder of the peripheries of the valve members being mutually inclined with respect to the plane containing the long axis of the duct and said cross-sectional axis of symmetry when the valve members are in their open position, and said valve members having their hinge axes lying parallel with said cross-sectional axis of symmetry so that when the valve members are moved to their closed position at least said part of the remainder of their peripheries butt one another in a plane containing the long axis of the duct and said cross-sectional axis of symmetry.

It will be appreciated that the valve means according to the feature of the invention just defined comprises a pair of valve members which are shaped, and which open and close rather like a bird's beak, the members in their closed position completely blocking the duct, and in their open position lying in and forming part of the wall of the duct so that the flow path through the duct is unimpeded.

The valve means as so far defined may be employed as a stop-valve in a duct. If the fluid to be conveyed is clean, i.e. contains no solid matter, it is preferred that the valve be arranged to hold itself shut by hinging the valve members downstream so that, in their operative position, the valve members "point" towards the pressure side of the valve and are held closed by the pressure of the fluid in the duct.

If the valve is to be used for fluids containing solid matter however it is preferred that in their closed position the valve members be arranged to point downstream, and that means forcibly holding the valve members together be employed. This prevents solid matter lodging between the valve members and the wall of the duct and hampering the opening of the valve.

More particularly, however, valve means according to the invention may be used for deflecting a stream of fluid out of the duct. In this case, according to another feature of the present invention, the duct is provided with at least one opening in its wall, the opening being positioned so as to be closed by one of said valve members when it is in its open position, said one of said valve members being hinged downstream of the opening. When the last mentioned feature of the invention is adopted the outer surface of said one of said valve members may be provided with a curved surface shaped to deflect fluid flowing out through said opening progressively outwardly from the direction of the duct.

According to another feature of the invention, the valve means may further comprise wall parts arranged externally of the duct which, together with said curved surface of said valve member constitute, when said one of said valve members is in its closed position, a branch duct having an outlet turned through at least 90° from the direction of the duct.

If desired, or necessary, the duct may, according to another feature of the present invention, have a plurality of openings in its walls each positioned so as to be closed by one of said valve members when it is in its open position, in which case wall parts are provided for each opening to constitute with surfaces provided on the outer surface of the valve member which closes the opening, when the valve member is moved to its closed position, a branch duct extending from the opening.

The principal application of that part of the present invention providing valve means for deflecting a stream of fluid out of the duct is as a thrust reverser for an aircraft jet propulsion installation, although it will be appreciated that the valve means according to the invention may be applied for the deflection out of a tubular duct of any gas stream through the duct as may be required, for example, in steel works plant or in gas turbine plant, or any other application where the deflection of a fluid flow out of a duct with only small loss of pressure head is required.

According to another feature of the invention an aircraft jet propulsion engine installation having a jet duct leading to a jet nozzle and valve means as previously defined for deflecting the jet stream out of the jet duct may include an airframe skin part adjacent said opening in the wall of said jet duct, said skin part having an opening, a flush-fitting closure member for said skin part opening, closure member moving means for moving said closure member between a closed position in which it closes said skin part opening and an open position in which the skin part opening is open, deflector means, and means for moving said deflector means between a position in which it lies wholly between the wall of said jet duct and said skin part, and a position in which one end of the deflector means is capable of receiving the exhaust gases of the jet stream issuing through said opening in the wall of the jet duct and the other end of the deflector means projects through said skin part opening and directs gases which it receives through said jet duct opening out through said skin part opening.

Preferably, in its open position, the closure member has at least its foremost part spaced away from said skin part and extended into the relative airstream over the skin part, and said deflector means comprises a deflector which is formed as part of, or is carried upon, the inner surface of said closure member, said deflector being shaped so that, when said closure member is moved to its open position and said valve members are moved to their closed position, said deflector receives exhaust gases issuing from said jet duct opening and discharges said gases forwardly between the foremost part of the closure member and said skin part.

According to another feature of the present invention said deflector means may further comprise a second deflector formed by or carried upon the outer surface of said one of said valve members, and said deflectors form a continuation one of the other when said closure member is moved to its open position and said one of said valve members is moved to its closed position.

It is preferred that said deflectors co-operate with wall parts arranged externally of the jet duct to form, when said valve members are in their closed position and said closure member is in its open position, a branch duct having a forwardly facing outlet.

According to another feature of the present invention each of said wall parts may be in two sections one of which is carried on the inner surface of said closure member so as to be retractable and extendable through said skin opening when said closure member is moved to its closed and open positions respectively, and the other of which is carried between the jet duct and said airframe skin part.

Alternatively however, according to another feature of the present invention, when the radial extent of the wall parts has to be kept to a minimum in the case where only a radially restricted space is available between the jet duct and the airframe skin part to accommodate the valve means, of the two sections of these wall parts one may be carried on the inner surface of the closure member so as to be retractable and extendable through said skin opening when the closure member is moved to its closed and open positions respectively, and the other may be hingedly mounted about a hinge axis arranged transversely of the jet duct so as to be movable between a retracted position in which it lies wholly between the wall of the jet duct and said skin part and an extended position in which it co-operates with the section carried by the closure member to form a continuous wall part bounding one side of said branch duct, and in this case means is provided to move the hingeably mounted sections between their retracted and extended positions, these means preferably being constituted by the closure member moving means.

More specifically, according to another feature of the present invention, the engine installation may comprise two air frame skin parts positioned on opposite sides and spaced from the wall of said jet duct, a pair of said openings in said jet duct wall, one of said openings in the jet duct wall facing an opening in one of said airframe skin parts and the other of said openings in the jet duct wall facing an opening in the other of said airframe skin parts, a pair of said flush-fitting closure members, one for each of said openings in the airframe skin parts, said closure member moving means being arranged to move said pair of closure members simultaneously and in the same sense between their closed and open positions, and a pair of said deflector means, one associated with each of the openings in said airframe skin parts, said means for moving said deflector means being arranged to move said pair of deflector means simultaneously and in the same sense between their operative and inoperative positions.

In both military and civil aircraft, it is desirable that take-off and landing runs be reduced as far as possible, with a view to reducing the size of the landing and take-off area required. Whereas take-off lengths can be reduced by supplementary power as supplied for example by jettisonable rocket motors, it is necessary to have a braking system on approach for purposes of rapid deceleration. Known braking systems include air brakes, altering the attitude of the aircraft, reversing the pitch of the propellers in propeller aircraft, to give a reversed thrust, reducing the pitch of the propellers to create a propeller drag, the use of drag parachutes, and the use of wheel brakes after touch-down.

In jet propelled aircraft, it has also been proposed to fit deflectors or thrust spoilers to the jet pipe to alter the direction of the thrust of the jet, or reduce the jet thrust respectively while still maintaining a substantial power output from the engine so that in the event of a false approach the engine may be made to develop its full power without loss of time and thereby avoid danger.

With an engine installation as previously defined the full jet flow can be given a new direction, of which the major component is forward, and the structural modification required to the engine jet pipe and to the nacelle and wing housing or fuselage may be so designed, as will hereinafter be made clear, that the small complication and additional weight of it are justified by the sensitive performance and control that may be obtained by its use.

Figure 4:
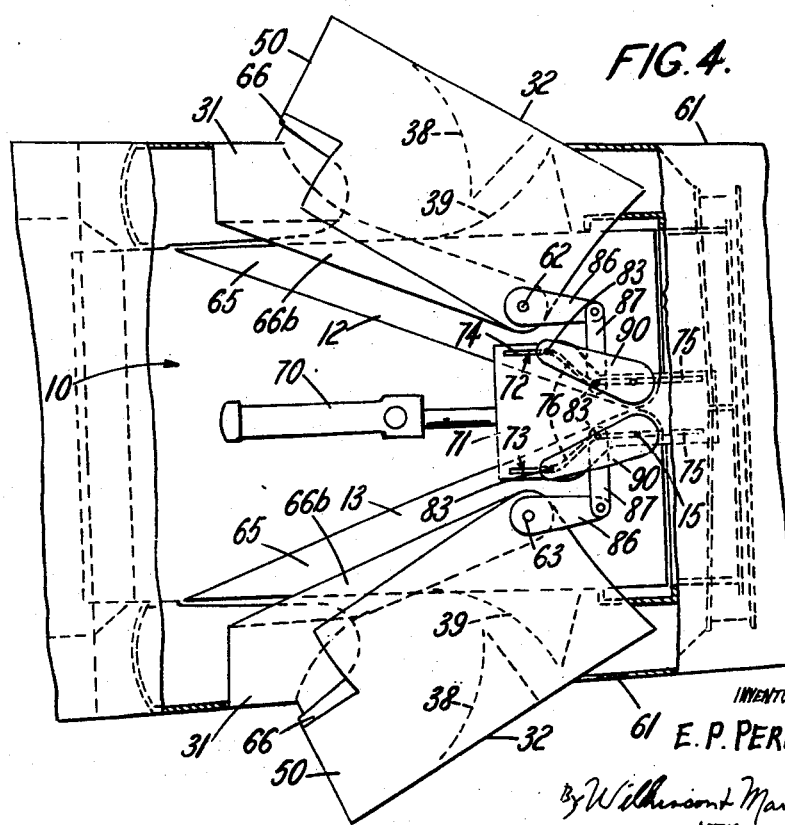
Figure 5:
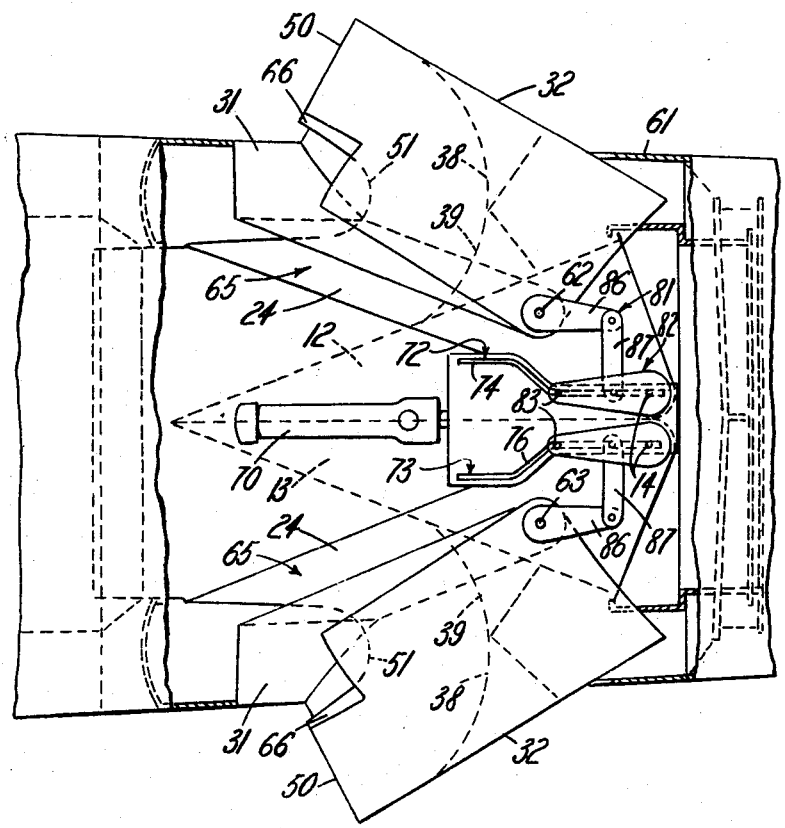
Figure 6:
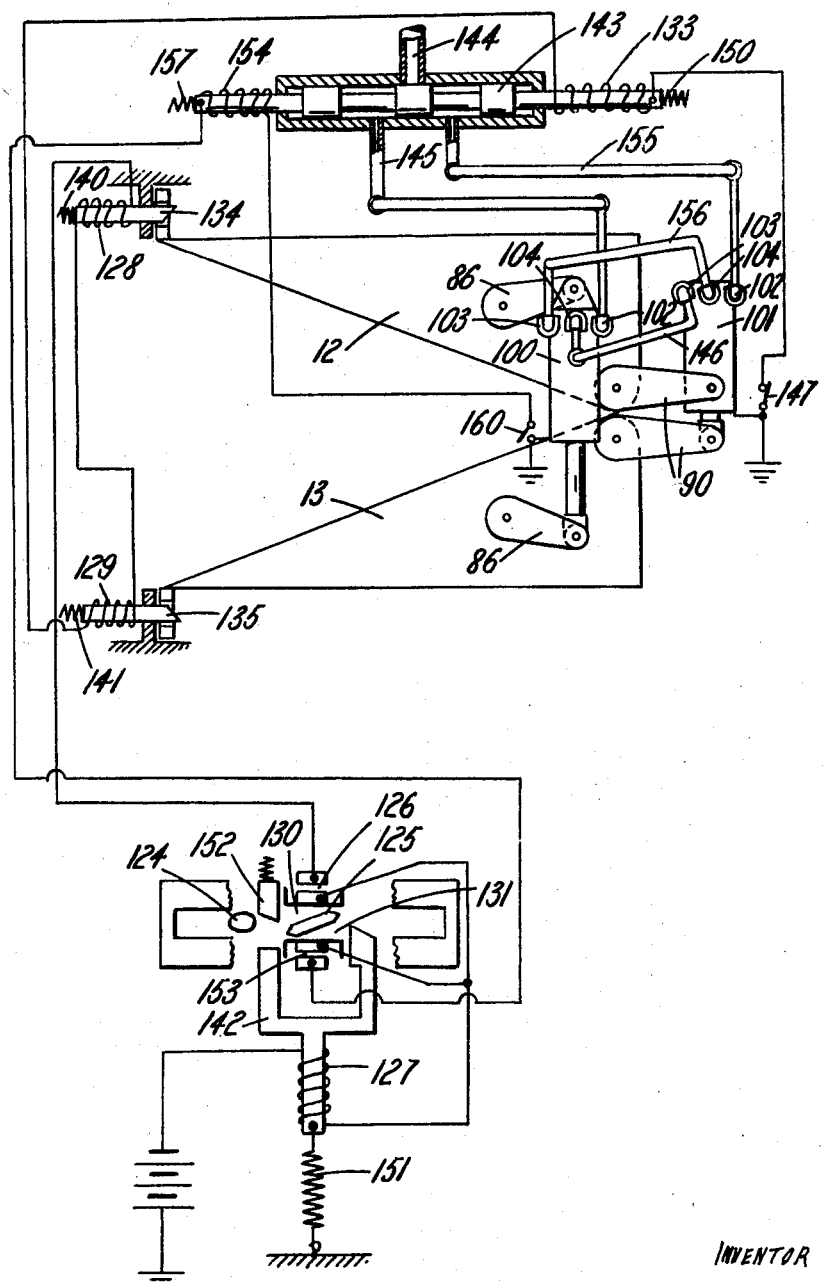

Specific embodiments of the present invention will now be described merely by way of example, with reference to the accompanying drawings whereof:

Figure 1 is a cross-sectional side elevation of a valve means according to the invention employed as a thrust reverser in an aircraft jet propulsion installation mounted in an aircraft wing, the valve means comprising two valve members which are shown in their open position and two closure members which are shown in their closed position, Figure 2 is a cross-sectional side elevation as shown in Figure 1, but with the valve members in their closed position and the closure members in their open position, Figures 3, 4 and 5 are corresponding side elevations of another valve means according to the invention employed as a thrust reverser in an aircraft jet propulsion installation mounted in an aircraft, the figures showing movable parts of the valve means in three different positions, and the means for moving the movable parts, Figure 6 is a diagrammatic representation of alternative means for moving the movable parts of the valve means shown in Figures 3, 4 and 5 together with control means therefor, Figures 7 and 8 are cross-sections on lines 7—7 of Figure 8 and 8—8 of Figure 7 showing details of construction of the moving means illustrated in Figure 6, and Figures 9, 10 and 11 are diagrams, showing another form of valve means according to the invention.

Referring first to Figures 1 and 2 of the drawings a cylindrical portion 11 of the jet duct 10 of the engine installation is provided with two impervious valve members 12 and 13. The valve members 12 and 13 are hingedly mounted at their downstream ends in the duct 10 about parallel spaced apart axes 14 and 15 lying in a plane normal to the long axis of the duct 10, the axes 14, 15 intersecting the wall of the duct at two points one on each side of the duct. The valve members 12 and 13 each have an internal surface 16 which is part cylindrical so that in their open position as shown in Figure 1 the valve members have their surfaces 16 contiguous with and forming a faired continuation of the internal surface 20 of the wall 21 of the duct 10.

The valve members are hinged so that a first part 22 of the periphery of each valve member remains substantially contiguous with the surface 20 when the valve members are moved to their closed position in which they extend into the duct as shown in Figure 2, and so that when the valve members are moved to their closed position the remainder 23 of their peripheries butt together in a plane containing the long axis and a cross-sectional axis of symmetry (i.e. in the present example a diameter) of the duct parallel to the axis 14 and 15, the valve members then forming a closure across the duct as clearly shown in Figure 2. Instead of the remainders 23 of the valve members abutting together to close the duct, part only of these remainders need abut together to close the duct in the case where an exhaust bullet is positioned in the duct upstream of the valve means, part of the remainders 23 of the peripheries of the valve means then closing on the exhaust bullet.

The shape of the valve members is such that their peripheral parts 22 lie in a plane which intersects the plane containing their peripheral parts 23 at a line parallel with the hinge axis 14 or 15 of the valve member, and when the members 12 and 13 are in their open position it will be noted that the planes containing their peripheral parts 23 are mutually inclined with respect to the long axis of the duct, the planes containing the peripheral parts 22 of the valve members then being arranged normally to the long axis of the duct. It will also be noted that the peripheral parts 22 of the valve members together extend round the whole of the periphery of the cross-section of the jet duct.

Each valve member, in its open position, lies in and closes an opening 24 (see Figure 2) in the wall 21 of the jet duct, the openings being substantially of the same shape and size as the valve members. Since the valve members are hinged at their downstream ends, when they are closed together they leave the openings 24 open and in communication with the jet duct upstream of the valve. In the construction being described the corners 26 of valve members 12 and 13 are rounded to avoid interference between these corners, and cheek pieces 26b are fitted to the duct wall to close-off small apertures which would otherwise be left open when they are in their closed position. The shape of the valve members is chosen so that the transverse area of the openings 24a leading to the openings 24 when the valve members are in their closed position is substantially equal to the cross-sectional area of the jet duct immediately upstream of the valve so that the cross-sectional area of the gas flow is not materially reduced when it is deflected through the openings 24.

In the construction now being described the jet duct 10 is located in an aircraft wing housing, or is housed in a nacelle in the wing. Airframe skin parts, in this case aerofoil skin parts 30, are positioned above and below and spaced from the duct 10, the terms "above" and "below" being used to refer to the positions of the skin parts 30 in relation to the duct 10 when the aircraft is in normal level flight.

The aerofoil skin parts 30 are each provided with an opening 31 which faces an opening 24, and a flush-fitting closure member 32 is provided for each of the openings 31 hinged along its rearmost edge 33 so as to be movable from a closed position as shown in Figure 1 in which it lies against a joggled rim 34 around the opening and and closes the opening to an open position as shown in Figure 2 in which its foremost edge 35 is spaced away from the skin part 30 into the relative airstream over the skin part. Means in the form of links, not shown, attached to the closure members towards their edges 35 are provided to move the closure members between their open and closed positions, and these links are actuated through associated linkages by one or more fluid operated jacks controlled in a manner similar to that presently described. The actuating linkages may take any known or convenient form and will not, in the present example be specifically described.

In an alternative arrangement the closure members 32 may also be supported on links towards their edge 33 instead of being hinged, so that the closure members may be moved bodily outwardly into the relative airstream over the skin parts 30 while being maintained substantially parallel to their position in the profile of the wing or nacelle.

Associated with each pair of facing openings 24, 31 is deflector means generally indicated at 37 (see Figure 2). The deflector means are movable from a position as shown in Figure 1 in which they lie wholly between the wall 11 of the duct 10 and one of the skin parts 30 to a position as shown in Figure 2 in which one end of each deflector means is positioned so as to be capable of receiving the exhaust gases of the jet stream issuing through the associated opening 24, and the other end of the deflector means projects through the associated opening 31 and directs the gases which it receives through the opening 24 out through the opening 31 between the edge 35 of the closure member associated with the opening and the adjacent skin part 30.

Each deflector means 37 comprises a deflector 38 formed as part of or carried upon the inner surface of the closure member 32 which in one position closes the opening 31 with which the deflector means is associated, and a second deflector 39 formed by or carried upon the outer surface of the valve member 12 or 13 which in one position closes the opening 24 with which the deflector means is associated.

When the valve members 12 and 13 are moved to their closed position and the closure members to their open position as shown in Figure 2 the deflectors 38 and 39 of each deflector means form a continuation one of the other to turn the exhaust gases issuing through the openings 24 in the duct through about 165° from their direction through the jet duct 10, the deflectors and the outer surfaces of the valve members upstream of the deflectors forming a pair of smooth flow paths for the substantial reversal of the jet stream. With the reversed streams ejected in directions inclined at 15° above and below the fore and aft direction of the aircraft, and assuming full and efficient flow and equivalent net nozzle areas to the main engine jet nozzle, a proportion equivalent to 96% of the forward thrust can in this way be made available for retardation of the aircraft. If a 20° angle is employed, then the proportion of the reversed thrust is 94% of the rearward thrust.

In moving to the positions of the valve and closure members, as shown in Figure 1, it is arranged, for example as presently described, that the valve members 12 and 13 are first moved to their open positions and the closure members 32 then moved to their closed positions.

The deflectors 39 are thus first swung back from their position as shown in Figure 2 to their position as shown in Figure 1 so that their edges 41 clear the edges 42 of the deflectors 38, and the deflectors 38 then retract into the spaces between the skin parts 30 and the duct 10 to lie in front of the deflectors 39 as shown in Figure 1. To reduce the gap between the edges 41 and 42 of the deflectors 38 and 39, the edges 41 and 42 are chamfered as shown. In moving from their positions as shown in Figure 1 to their positions as shown in Figure 2 the valve and closure members are, of course moved in the reverse order.

In order to obtain full and efficient flow of the reversed jet streams, the deflector means 37 in each case co-operates with wall parts generally indicated at 43, 44 see Figure 2 arranged externally of the duct 10 to form, when the valve members 12, 13, and the closure members 31 are in their positions as shown in Figure 2 a pair of completely enclosed branch ducts each having a forwardly facing outlet 50. In the example being described each of the wall parts is in two sections one of which, 51 for example, is fixedly carried between the duct 10 and one of the skin parts 30, and the other of which, 52 for example, is carried by the inner surface of the adjacent closure member 32 the sections of the wall parts being arranged so that they form a continuation one of the other when the closure members 32 are moved to their open position.

It may now be appreciated that the sections of the wall parts carried between the duct 10 and the skin parts 30 together with the deflectors 39 form a part of open topped turret-like structures connecting the nacelle or outer wing skin with the jet duct around the openings 24, the turret-like structures being positioned one above and one below the jet duct. The fixed parts of these turret-like structures hereinafter termed fixed turret-like structures are each reinforced with lateral guide vanes 55 which form part of a cascade to help in deflecting the jet stream through the fixed turret-like structures in a direction substantially at right angles to its direction of flow through the duct 10 when the valve members 12 and 13 are moved to their closed positions. An end guide vane 56 of the cascade is supported from the outer surface of each valve member upstream of the deflector 39 on the valve member.

The open tops of these fixed turret-like structures lie more or less immediately inside the skin parts 30, that is immediately inside the respective closure member 32 when these are in their closed positions.

It may now further be appreciated that the sections of the wall parts carried by the closure members together with the deflectors 38 form a pair of movable turret-like structures having the forwardly facing outlets or nozzles 50, which movable turret-like structures in the closed position of the closure members fit into the spaces between the duct 10 and the upper and lower skin parts 30. The movable turret-like structures are designed to deflect the jet stream issuing through the open tops of the fixed turret-like structures forwardly through a further 75° and are each provided with a transverse guide vane 57 to assist in deflecting the gas stream in this manner, the guide vanes 57 being positioned so that they are clear of the guide vanes 55 when the closure members are moved to their closed position as shown in Figure 1.

The forwardly facing outlets 50 are each rectangular in shape but with rounded corners, and the closure members 32 carrying the movable turret-like structures are arranged so that when moved to their open positions the outlets 50 are brought clear of the outer surface of the skin parts 30, of the wing or nacelle as shown in Figure 2 so that the reversed jet issuing therefrom is directed clear of the relative air-stream over the wing surface which contributes to the lift of the aircraft. The chordwise extending edges of each closure member are also swept round towards the duct 10 so as to terminate inside the wing or nacelle structure both in the open and closed positions of the closure member and are shaped to form a cowling round the movable turret-like structure on the closure member which cowling has a rounded forwardly facing profile to deflect the relative air-stream around the turret-like structure.

In order to seal the openings 24 in the duct 10 when the valve members 12 and 13 are moved to their open positions in which they are positioned one in each of the openings any known or convenient form of sealing means is provided along the edges 23 of the valve members, and a spherical seal 60 is provided between the edge 22 of each valve member and the rear edge of each of the openings 24 which is effective in all positions of the valve member.

Instead of the spherical seal 60 two circumferential seals may be provided as illustrated in Figures 3, 4 and 5, to seal the edges 22 of the valve members when the valve members are in their open and closed positions only.

The chordwise extending and foremost edge 35 of the closure members may also carry sealing means which, when the closure members are in their open position, engage with the adjacent skin part 30 to seal the gaps between the closure members and the skin parts. Similar sealing means may also be provided which are operative in the closed positions of the closure members.

In the thrust reverser shown in Figures 3, 4 and 5, like parts are indicated by the same reference numerals as used in Figures 1 and 2. In this case the jet duct 10 which as before, is cylindrical in cross-section, is housed in an aircraft, and the movable parts of the thrust reverser between the jet duct and an airframe skin 61 forming part of the skin of a wing, nacelle or engine "pod," the skin in the latter case completely surrounding the jet duct.

In this case it is assumed that only a limited space radially of the duct is available to incorporate the thrust reverser, and as may be seen from Figures 3, 4 and 5 the closure members 32 are designed so that they have an overall length which is less than that of the valve members 12 and 13.

To this end the closure members 32 are hinged about hinge axes 62, 63 arranged transversely well within the airframe structure, that is about the rear inner corners of the movable turret-like structures carried by the closure members. The sections of the wall parts which extend longitudinally of the jet duct and which in the construction described with reference to Figures 1 and 2 make up the longitudinally extending sides of the fixed turret-like structures are in this case also carried between the jet duct and the skin 61, and support the hinges relating to the axes 62 and 63 respectively. In Figures 3, 4 and 5 these wall part sections are indicated by the reference numeral 65. The two wall part sections 65 associated with each branch duct have extending transversely between them a further wall part section 66 which is carried by a pair of arms 66b freely hinged on the hinge axis 62 or 63 the sections 65 and which forms the lower wall of the outlet 50 of the branch duct when moved to an extended position as shown in Figures 4 and 5. In their retracted positions as shown in Figure 3, the wall part sections 66 lie wholly within the space between the duct 10 and the airframe skin 61 and as may be seen from this figure are each positioned like a saddle across the duct 10. The wall part section 51 previously described, are retained, these being carried by the duct 10 and passing rearwardly between the sections 65 and between the duct wall and the respective wall part section 66 and then curving round away from the duct to a position in which they join each with the respective wall part 66 when the wall parts 66 are moved to their extended positions as shown in Figures 4 and 5.

Two compressed air operated jacks 70 are mounted one on each side of the duct 10 in the space between the duct and the airframe skin 61. Each jack 70 is operable to move a cam member 71 to and fro along a fixed path parallel to the long axis of the duct 10, and each cam member is provided with a pair of cam tracks 72 and 73 each having two lost motion portions 74 and 75 parallel with the fixed path and an intermediate or operative portion 76 inclined to the fixed path. The portions 76 on each cam member converge towards one another so that followers engaged in these portions are drawn together. Each cam track co-operates with a pair of linkages generally indicated at 81 and 82 each having a follower engaged in the track, at points spaced apart along the track by an amount equal to the length of the portion 76 of the track so that only one of the followers can engage in the portion 76 of the track at a time.

In the example being described each linkage 81 comprises a lever arm 86 pivotally mounted about the hinge axis of the closure member 32 on the side of the cam member adjacent the track in which the follower 83 associated with the linkage is engaged, and a link 87 connected at one end to the lever arm 86 at a point spaced from its pivot, the other end of the link 87 carrying a follower 83, the arrangement being such that when the cam member 71 is moved to the right in Figures 3, 4 and 5 the links 87 are drawn together, and when the cam member 71 is moved to the left in Figures 3, 4 and 5 the links 87 are forced apart. The consequent rotation of the lever arms 86 is employed to move the closure members 32 and the wall part sections 66 between their open and closed and extended and retracted positions respectively. The lever arms 86 move the closure members 32 directly and the wall part sections 66 each through a lost motion device, not shown, so that in going from their positions shown in Figure 3 to the positions shown in Figure 4 the closure members 32 are first moved into alignment with the arms 66b and then together with the wall part sections 66 to their open and extended positions respectively as shown in Figure 4, and in going from their positions as shown in Figure 4 to their positions as shown in Figure 3, both sections first move until the wall part sections 66 reach their retracted positions and the closure members alone then move on into their closed positions as shown in Figure 3.

The linkages 82 in the present example each consist of a lever arm 90 fixedly carried from one of the valve members 12 or 13 so as to be pivotable about the hinge axis 14 or 15 of the valve member, the lever arms 90 each carrying a follower 83 at a point spaced from their pivot, and with this arrangement it will be clear that as the cam member 71 is moved to the left in Figures 3, 4 and 5 the lever arms 90 are rotated to move the valve members 12 and 13 from the open position as shown in Figures 3 and 4 to their closed positions as shown in Figure 5, and as the cam member 71 is moved to the right in Figures 3, 4 and 5, the valve members 12 and 13 are moved from their closed position as shown in Figure 5 to their open position as shown in Figures 3 and 4.

Furthermore since only one of the followers 83 in each track may engage in the portion 76 of the track at a time it will be clear that movement of the closure members 32 and the valve members 12 and 13 will take place successively.

The followers 83 carried by the lever arms 90 are in front of the followers 83 carried by the links 87 and consequently when the cam member is moved from the position as shown in Figure 3 to the position as shown in Figure 5, the closure members 32 are first moved to their open position, and the valve members to their closed position and when the cam members are moved from their position as shown in Figure 5 to their position as shown in Figure 3, the valve members are first moved to their open position and the closure members are then moved to their closed position. The moving means just described may be employed in the construction shown in Figures 1 and 2, and in this case the links 87 have their outer ends connected directly to the closure members 32 towards the foremost edge 35 of the closure members, and the lever arms 90 are connected to the valve members 12 and 13.

Referring now to Figure 6, instead of the arrangement just described, the closure members 32 and the wall part sections 65 may be moved by one air-operated jack 100 on each side of the jet duct 10 and the valve members 12 and 13 by another air operated jack 101 on each side of the duct 10, the two jacks 100 and 101 on each side of the jet duct being inter-connected for operation in sequence in the manner presently explained.

The construction of the jacks 100 and 101 is shown in Figures 7 and 8. Referring to Figure 8 the cylinder of each jack has two compressed air supply fittings indicated at 102 and 103, and a by-pass fitting indicated at 104. The fittings 102, 103, 104, are all constructed as trunnions with internal seals, 106, so as to avoid the necessity of using flexible pipes. When compressed air is supplied to the fitting 102 it follows the path indicated by the arrows 105 and opens a spring loaded valve 107 (see also Figure 7) thus allowing the space 108 in the cylinder 109 on the left hand side of the piston 110 in Figure 7 to exhaust to the atmosphere through a duct 111 normally closed by the valve 107. Air supplied to the fitting 102 also passes to a supply valve 112 which communicates the space 113 in the cylinder 109 on the right hand side of the piston 110 in Figure 7. The valve 112 is held open by the piston 110 when the latter is at the right hand end in Figure 7 of its stroke so that compressed air enters the space 113 and provides an impulse to move the piston 110 towards the left in Figure 7. After a short piston movement the valve 112 closes, but the piston continues to move by expansion of the air trapped in the space 113. The valve 112 is provided with a leakage path in the form of a small diameter bore 115, so that should an unexpected resistance prevent the piston 110 completing its movement to the left, in Figure 7, more air pressure becomes available through the bore 115.

This system is designed to economise in the use of high pressure air which is compressed by an engine-driven compressor and is stored in a pressure vessel so that the operation of the thrust reverser is made independent of whether or not the engine is running.

As the piston 110 reaches the left hand end of the cylinder 109 in Figure 7 it engages the stem 116 of a relay valve generally indicated at 117 so that the relay valve is lifted from its seating to permit air supplied through the fitting 102 to flow out through the fitting 104 along a path indicated by the arrows 118. This air operates the other jack 100 or 101 as later described.

When air is supplied to the fitting 103 it follows a path indicated by the arrows 120 and opens a spring-loaded valve 122 to connect the space 113 in the cylinder 109 on the right-hand side of the piston 110 in Figure 7 with atmosphere through a duct 123, the valve 122 normally closing this duct. At the same time compressed air enters the space 108 in the cylinder 109 on the left hand side of the piston 110 in Figure 7 through the supply valve 223 which is the same as the valve 112 previously described, the piston 110 then being moved to the right in Figure 7.

Referring again to Figure 6, the operation of the thrust reverser is controlled by the throttle lever 124 of the engine. The throttle lever 124 is movable along a slot in a guide plate and the guide slot contains a deflecting island 125 at an intermediate position corresponding to idle running of the engine. Movement of the throttle lever 124 to the left in Figure 6 from this position corresponds to increasing the ahead thrust developed by the engine, while movement to the right from this position, in Figure 6, corresponds to increasing the reverse thrust developed by the engine, that is, with the thrust reverser in operation. Thus in going from ahead to reverse thrust the throttle lever must be moved through the intermediate minimum power range, and in going from ahead to reverse the throttle lever follows the path 130 past the deflecting island 125, while in going from reverse to ahead thrust the throttle lever follows the path 131 on the other side of the deflecting island 125. When the throttle lever 124 is moved into its minimum power range along the path 130 it closes the contacts of an electric switch 126 and completes a circuit through the solenoids 127, 128, 129 and 133 so that the solenoid operated latches 134 and 135 which normally hold the valve members 12 and 13 in their open positions are withdrawn against the action of the springs 140 and 141, so that a solenoid operated detent 142 is moved upwardly in Figure 6 to prevent the throttle lever 124 being moved to the right in Figure 6 out of its minimum power range along the path 130, and so that a control valve 143 is moved to the right in Figure 6 to connect a conduit 144 leading from a source of compressed air to pipes 145 communicating with the fittings 102 of the jacks 100. Compressed air is consequently supplied to the jacks 100 so that the closure members 32 and the wall section parts 65 are moved to their open and extended positions respectively as shown in Figures 4 and 5. At the end of the stroke of the pistons 110 of the jacks 100 the relay valves 117 of the jacks are operated and compressed air from the pipes 145 is by-passed to the fittings 104 of the jacks 100 and through pipes 146 to the fittings 103 of the jacks 101. The jacks 101 are thereby operated to move the valve members 12 and 13 to their closed position as shown in Figure 5. On completion of the strokes of the jacks 101, a switch 147 in the energising circuit of the solenoids 127, 128, 129 and 133 is opened and these solenoids are thereby de-energised whereupon the control valve 143 is moved by a spring 150 to the left in Figure 6, back to its neutral position as shown in Figure 6. At the same time the latches 134 and 135 are returned to their operative positions as shown in Figure 6 and the detent 142 is withdrawn by a spring 151 so that the throttle lever 124 may be moved to the right in Figure 6 along the path 130 out of its minimum power range to increase the reverse thrust. To prevent the throttle lever 124 being incorrectly moved out of the minimum power range to the left in Figure 6 when proceeding from ahead to reverse thrust a spring pressed latch 152 is provided.

When returning from reverse to ahead thrust the throttle lever 124 is moved back into its minimum power range along the path 131, and when moved along this path it closes the contacts of an electric switch 153 in circuit with the solenoid 127 and a solenoid 154 whereby these solenoids are energised. Energisation of the solenoid 127 moves the detent 142 upwardly in Figure 6 to prevent the throttle lever 124 from being moved out of its minimum power range along the path 131 while energisation of the solenoid 154 displaces the control valve 133 to the left in Figure 6 and thereby places the conduit 144 in communication with pipes 155 which lead compressed air to the fittings 102 of the jacks 101. The jacks 101 are thereby actuated and move the valve members 12 and 13 from their closed position as shown in Figure 5 to their open position as shown in Figures 3 and 4, the latches 134 and 135 latching in when the valve members reach their open position to retain the valve members in their open position until the solenoids 128 and 129 are again energised. On completion of the stroke of the pistons 110 of the jacks 101 the switch 147 is closed to re-arm the thrust reversing circuit and the relay valves 117 of the jacks 101 are opened whereby compressed air is by-passed from the pipes 155 to the fittings 104 on the jacks 101 and through pipes 156 to the fittings 103 of the jacks 100. The jacks 100 are thereby actuated to move the closure members 32 and the wall part sections 65 to their closed and retracted positions respectively, and on completion of the strokes of the pistons 110 of the jacks 100 a switch 160 in circuit with the solenoids 127 and 154 is opened thereby de-energising these solenoids. The spring 151 then withdraws the detent 142 allowing the throttle lever 124 to be moved to the left in Figure 6 to increase the thrust ahead, and a spring 157 moves the control valve 143 back to its neutral position as shown in Figure 6.

Following the return from reverse to ahead thrust the switch 160 is left open. It will be appreciated, however, that, like the switch 147 the switch 160 will be closed to arm the de-reversing circuit when the pistons 110 of the jacks 100 reach the end of their stroke corresponding to movement of the closure members to their open position.

As will be seen from Figure 6 the jacks 100 are connected between the lever arms 86, the cylinder 109 being pivoted directly to one of the lever arms 86 and the piston rod pivoted directly to the other of the lever arms 86. The same arrangement applies with the cylinders 101 the elements of which are connected respectively to the lever arms 90.

It will also be noted from Figure 7 that the relay valves 117 are carried in the end wall of the cylinders of the jacks 100 and 101 and are operated by the relative movement between the elements of the jacks.

The valve means according to the invention which have been specifically described each comprise only two valve members, and the valve means has been described as applied to the closing of a cylindrical duct.

It is to be understood however that the valve means may comprise more than two valve members, and may be applied to a duct having a cross-sectional shape which is other than circular.

Returning for the moment to the simplest case in which two valve members are used to close a circular sectioned duct it will be noted that, in theory, assuming the duct wall has no thickness, the valve members may each be cut from the duct wall by making two plane cuts which intersect along a diameter of the duct one normal to the long axis of the duct and the other inclined to the plane containing said diameter and the long axis of the duct. Provided that the two valve members are identical in shape and are hinged along a common diameter at the intersection of planes bounding the valve members, the valve members can then be moved so that their edges lying in said inclined planes abut together in the plane containing the common hinge diameter and the long axis of the duct, and in this position they will substantially close the duct.

In this closed condition the boundaries of the moving surfaces of the two valve members are coincident with the intersection lines generated by the moving surfaces of the valve members, and provided that the duct has a cross-sectional shape such that this condition can be fulfilled then it is possible to arrive at a valve means having two or more than two valve members cut from the wall of the duct which can be swung to a position in which the boundaries of their moving surfaces butt together, the valve members then forming a closure across the duct.

Thus in order to design a valve means according to the invention having more than two valve members, one choses a point in the duct and a number of hinge axes for the valve members which hinge axes in theory intersect with one another at the duct wall, but in practice may intersect somewhat outside the wall of the duct, and form a closed polygon on a cross-sectional projection of the duct with the point inside it. Then one swings the duct about each hinge axis in the directions in which the valve member hinged about the axis is to move in going to its closed position until a point on the surface of the duct is coincident with the chosen point.

The lines of intersection between the swung positions of the duct then determine those boundaries of valve members which abut with each other in the closed position of the valve.

Figure 9:
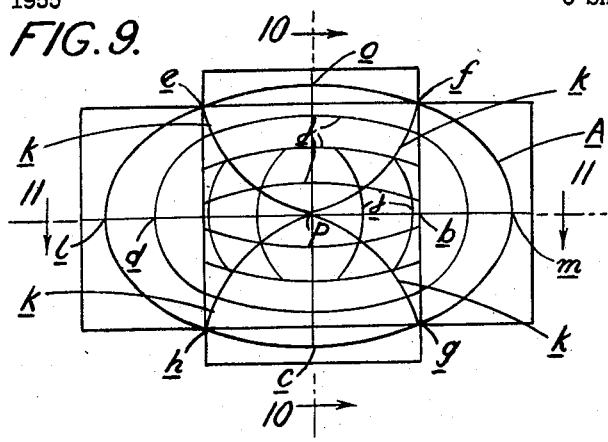
Figure 10:
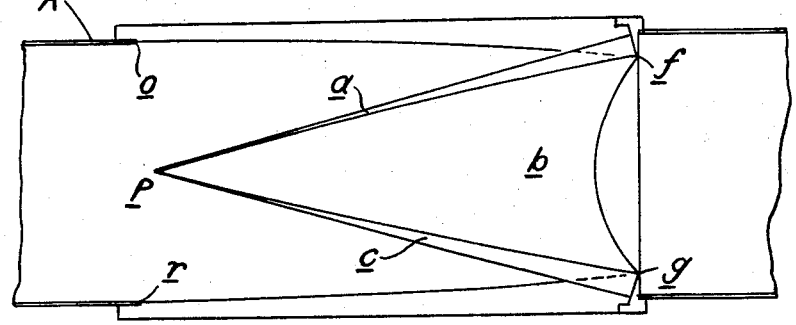
Figure 11:
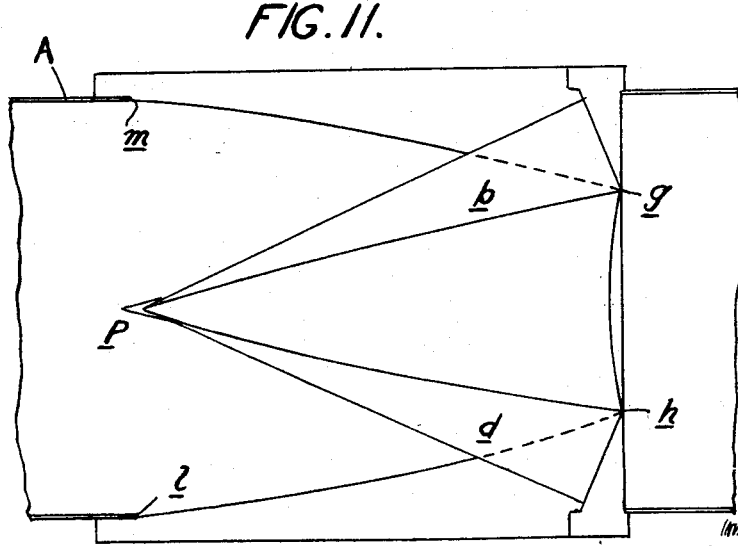

In illustration of this general principle Figures 9, 10 and 11 are diagrams which show an eliptical sectioned duct A closed by four valve members a, b, c, and d cut from the wall of the duct. The valve members are hinged respectively along the axes ef, fg, gh, and he which intersect one another at the duct wall, in this case, to form a rectangle. In order to arrive at boundaries for the moving surfaces of the members a, b, c, and d such that the valve members can be swung about their hinge axes to butt together and close the duct, a point P is chosen in the duct and the duct is swung about each of the hinge axes ef, fg, gh, and he in turn until a point o, m, r or l respectively on the surface of the duct is coincident with the point P.

The lines j in Figure 9 represent in cross-sections part of the wall of the duct in each of its swung positions, and it will be seen that the lines k are the intersection lines of the swung positions of the duct, the lines k determining the boundaries of the valve members a, b, c, and d.

A valve means comprising two valve members instead of four could be designed for the duct A, by swinging the duct about the axis $l$, $m$, or $o$, $r$ in one direction until a point on the surface of the duct is co-incident with the point P and then in the other direction until another point on the surface of the duct is co-incident with the point P, the lines of intersection between the swung positions of the duct then determining the boundaries of the valve members which can abut with one another to close the duct.

I claim:

1. In an aircraft, in combination, an airframe structure, a jet propulsion engine mounted in said airframe structure and comprising a jet pipe also mounted in said airframe structure, said jet pipe having an opening in its wall, and valve member means in said jet pipe, said valve member means being movable between a closed position in which it extends into the jet pipe and an open position in which it closes off the opening in the jet pipe and forms a faired continuation of the internal surface of the jet pipe, an airframe skin part on said airframe structure adjacent said opening in said jet pipe, said skin part having an opening therein, closure member means carried by said structure and movable between a flush position in which said closure member means fits flush on said skin part covering said skin part opening, and an open position in which at least its foremost part is spaced away from said skin part and extends into the relative airstream over said skin part, first deflector means on said valve member means, and second deflector means on said closure member means, said first and second deflector means lying wholly between the wall of said jet pipe and said skin part when said valve and closure member means are in their open and flush positions respectively and forming a continuation of one another when said valve and closure member means are in their closed and open positions respectively, to receive exhaust gases of the jet stream flowing out of the jet pipe and to direct these clear of the relative airstream flowing out of the jet pipe and to direct these clear of the relative airstream over the outer surface of said skin part.

2. In an aircraft, in combination, an airframe structure, a jet propulsion engine mounted in said airframe structure and comprising a jet pipe also mounted in said airframe structure, valve means in said jet pipe for deflecting the jet stream out of said jet pipe, said valve means comprising a plurality of impervious valve members hinged about axes lying in a plane normal to the long axis of the jet pipe, the hinge axis of each valve member crossing the jet pipe and intersecting the wall of the jet pipe at two points, each valve member extending at all times substantially wholly on the side of its hinge axis adjacent the upstream end of the jet pipe and having an internal surface curved in cross-section, each valve member being movable about its hinge axis between an open position in which its internal surface forms a faired continuation of the internal surface of the wall of the jet pipe and a closed position in which it extends into the jet pipe, each valve member having a first peripheral edge part which remains at all times substantially contiguous with the internal surface of the wall of the jet pipe, said first peripheral edge parts of all the valve members together extending substantially around the whole of the periphery of the cross-section of the jet pipe and a second peripheral edge part, said second peripheral edge parts in the closed position of the valve members, butting together and forming a closure across the jet pipe, and valve member moving means operatively connected to said valve members for moving said valve members between their open and closed positions, said jet pipe having an opening in its wall, which opening is closed by one of said valve members when said one of said valve members is in its open position, an airframe skin part on said airframe structure adjacent said opening in the wall of said jet pipe, said skin part having an opening, a flush-fitting closure member for said skin part opening carried from said airframe structure, closure member moving means connected between said closure member and said airframe structure for moving said closure member between a closed position in which said skin part opening is open, said closure member having when in its open position at least its foremost part spaced away from said skin part and extending into the relative airstream over said skin part, deflector means movable between an inoperative position in which it lies wholly between the wall of said jet pipe and said skin part, and an operative position in which one end of the deflector means receives exhaust gases of the jet stream flowing out of the jet pipe through said opening in the wall of the jet pipe and the other end of said deflector means projects through said skin part opening to direct the exhaust gases clear of the relative airstream over the outer surface of said skin, said deflector means comprising a first deflector on the inner surface of said closure member, and a second deflector on the outer surface of said one of said valve members, said deflectors forming a continuation one of the other when said closure member is moved to its open position and said one of said valve members is moved to its closed position.

3. The combination of claim 2 further comprising wall parts arranged externally of the jet pipe to form with said deflector means, when said valve members are in their closed position and said closure member is in its open position, a branch duct having a forwardly facing outlet, said wall parts including a wall part which extends transversely of the jet pipe and which comprises a first wall section which is fixed relative to the jet pipe and is carried between the jet pipe and said airframe skin part, and a second wall section which is hingeably mounted about a hinge axis arranged transversely of the jet pipe and is movable between a retracted position in which it lies wholly between the wall of the jet pipe and said skin part and an extended position in which it cooperates with said first section to form a continuous wall part bounding one side of said branch duct.

4. The combination of claim 3, wherein said closure member moving means is also connected to move said second wall section between its extended and retracted positions.

5. The combination of claim 4, wherein said closure member moving means is connected to move said closure member directly and said second wall section through a lost motion device permitting operation of said closure member moving means over one range of movement to move said closure member between its closed position and a partly open position without moving said second wall section.

6. In an aircraft, in combination, an airframe structure, a jet propulsion engine mounted in said airframe structure and comprising a jet pipe also mounted in said airframe structure, valve means in said jet pipe for deflecting the jet stream out of said jet pipe, said valve means comprising a plurality of impervious valve members hinged about axes lying in a plane normal to the long axis of the jet pipe, the hinge axis of each valve member crossing the jet pipe and intersecting the wall of the jet pipe at two points, each valve member extending at all times substantially wholly on the side of its hinge axis adjacent the upstream end of the jet pipe and having an internal surface curved in cross-section, each valve member being movable about its hinge axis between an open position in which its internal surface forms a faired continuation of the internal surface of the wall of the jet pipe and a closed position in which it extends into the jet pipe, each valve member having a first peripheral edge part which remains at all times substantially contiguous with the internal surface of the wall of the jet pipe, said first peripheral edge parts of all the valve members together extending substantially around the whole of the periphery of the cross-section of the jet pipe and a second peripheral edge part, said second peripheral edge parts in the closed position of the valve members butting together and forming a closure across the jet pipe, and valve member moving means operatively connected to said valve members for moving said valve members between their open and closed positions, said jet pipe having an opening in its wall, which opening is closed by one of said valve members when said one of said valve members is in its open position, an airframe skin part on said airframe structure adjacent said opening in the wall of said jet pipe, said skin part having an opening, a flush-fitting closure member for said skin part opening carried from said airframe structure, closure member moving means connected between said closure member and said airframe structure for moving said closure member between a closed position in which said skin part opening is open, said closure member having when in its open position at least its foremost part spaced away from said skin part and extending into the relative airstream over said skin part, deflector means movable between an inoperative position in which it lies wholly between the wall of said jet pipe and said skin part, and an operative position in which one end of the deflector means receives exhaust gases of the jet stream flowing out of the jet pipe through said opening in the wall of the jet pipe and the other end of said deflector means projects through said skin part opening to direct the exhaust gases clear of the relative airstream over the outer surface of said skin, said deflector means comprising a first deflector on the inner surface of said closure member, and a second deflector on the outer surface of said one of said valve members, said deflectors forming a continuation one of the other when said closure member is moved to its open position and said one of said valve members is moved to its closed position, the combination further comprising wall parts arranged externally of the jet pipe to form with said deflector means, when said valve members are in their closed position and said closure member is in its open position, a branch duct having a forwardly facing outlet, said wall parts including a wall part which extends transversely of the jet pipe and which comprises a first wall section which is carried between the jet pipe and said airframe skin part, and a second wall section which is hingeably mounted about a hinge axis arranged transversely of the jet pipe and is movable between a retracted position in which it lies wholly between the wall of the jet pipe and said skin part and an extended position in which it co-operates with said first section to form a continuous wall part bounding one side of said branch duct.

7. The combination of claim 6, wherein said closure member moving means and said valve member moving means comprise a common jack operable to move a cam member to and fro along a fixed path, said cam member being provided with a pair of cam tracks each having two lost motion portions parallel with the fixed path and an intermediate or operative portion inclined to the fixed path, and said tracks co-operate each with a pair of linkages one for transmitting opening and closing movement to one of said valve members, and the other for transmitting opening and closing movement to said closure member, the linkages being provided with followers engaged with the cam track at points spaced apart along the track by an amount not less than the length of the operative portion of the track so that only one of the followers in each track may engage in the operative portion of the track at a time.

8. In an aircraft, in combination, an airframe structure, a jet propulsion engine mounted in said airframe structure, said engine having a power control throttle and comprising a jet pipe also mounted in said airframe structure, valve means in said jet pipe for deflecting the jet stream out of said jet pipe, said valve means comprising a plurality of impervious valve members hinged about axes lying in a plane normal to the long axis of the jet pipe, the hinge axis of each valve member crossing the jet pipe and intersecting the wall of the jet pipe at two points, each valve member extending at all times substantially wholly on the side of its hinge axis adjacent the upstream end of the jet pipe and having an internal surface curved in cross-section, each valve member being movable about its hinge axis between an open position in which its internal surface forms a faired continuation of the internal surface of the wall of the jet pipe and a closed position in which it extends into the jet pipe, each valve member having a first peripheral edge part which remains at all times substantially contiguous with the internal surface of the wall of the jet pipe, said first peripheral edge parts of all the valve members together extending substantially around the whole of the periphery of the cross-section of the jet pipe and a second peripheral edge part, said second peripheral edge parts in the closed position of the valve members butting together and forming a closure across the jet pipe, and valve member moving means operatively connected to said valve members for moving said valve members between their open and closed positions, said jet pipe having an opening in its wall, which opening is closed by one of said valve members when said one of said valve members is in its open position, an airframe skin part on said airframe structure adjacent said opening in the wall of said jet pipe, said skin part having an opening, a flush-fitting closure member for said skin part opening carried from said airframe structure, closure member moving means connected between said closure member and said airframe structure for moving said closure member between a closed position in which said skin part opening is open, said closure member having when in its open position at least its foremost part spaced away from said skin part and extending into the relative airstream over said skin part, deflector means movable between an inoperative position in which it lies wholly between the wall of said jet pipe and said skin part, and an operative position in which one end of the deflector means receives exhaust gases of the jet stream flowing out of the jet pipe through said opening in the wall of the jet pipe and the other end of said deflector means projects through said skin part opening to direct the exhaust gases clear of the relative airstream over the outer surface of said skin, said deflector means comprising a first deflector on the inner surface of said closure member and a second deflector on the outer surface of said one of said valve members, said deflectors forming a continuation one of the other when said closure member is moved to its open position and said one of said valve members is moved to its closed position, said combination further comprising interlock means in operative connection with said valve member moving means for preventing the operation of said valve member moving means to move said valve members from their open position to their closed position when said closure member is in its closed position and control means in operative connection with said control throttle and actuated by movement of said throttle in one direction into a minimum power range to initiate the operation of said closure member moving means to move said closure member from its closed position to its open position and then the operation of said valve member moving means to move said valve members from their open position to their closed position, and by movement of said throttle in the reverse direction into said minimum power range to initiate the operation of said valve member moving means to move said valve members from their closed position to their open position, and then the operation of said closure member moving means to move said closure member from its open position to its closed position.

9. The combination of claim 8, wherein said control means comprises a control valve having a first position in which it connects a source of fluid under pressure with the cylinder of the closure member moving jack on the side of its piston to operate the jack in the sense to move said closure member to its open position, and a second position to connect said source of fluid under pressure with the cylinder of the valve member moving jack on the side of its piston to operate the jack in the sense to move said valve members to their open position, first means to move said control valve into its first position when said throttle is moved in said one direction into said minimum power range, and second means to move said control valve into its second position when said throttle is moved in said other direction into said minimum power range.

10. The combination of claim 9 wherein said first means comprises an electric switch closed by said throttle when the throttle is moved in said one direction into said minimum power range and a solenoid in circuit with said switch and energizable by closure thereof, to move said control valve into its first position against the action of spring means, and wherein a further normally closed electric switch is provided in circuit with the solenoid, which further switch is opened when said valve members reach their closed position to de-energize the solenoid and allow said spring to move said control valve to a neutral position.

11. The combination of claim 10, wherein a solenoid operated latch is provided to retain each of said valve members in its open position, the operating solenoids of the latches being connected in circuit with said throttle operated switch so that they are energised by closure of the throttle operated switch to withdraw the latches each against the action of a spring.

12. The combination of claim 10, wherein said second means comprises a second electric switch closed by said throttle when the throttle is moved in said other direction into said minimum power range, and a second solenoid which second solenoid is in circuit with said second switch and is energizable by the closure thereof, the solenoid being arranged to move said control valve into its second position against the action of said spring means, and wherein a second normally closed electric switch is provided in circuit with said second solenoid, which switch is opened when said closure member reaches its closed position to de-energize the second solenoid and allow said spring means to move said control valve to a neutral position.

13. The combination of claim 12, wherein movement of said throttle in said one direction through said minimum power range is along one path, and movement of said throttle through said minimum power range in said other direction is along a different path, and a latch is provided at one end of said one path to prevent the movement of said throttle out of said minimum speed range along said one path and a solenoid operated detent is provided to prevent movement of said throttle out of said minimum speed range along said one path at the other end of said one path and along said different path at both ends of said different path, said detent being moved to its operative position against the action of a spring when its solenoid is energised, the detent solenoid being in circuit with each of said throttle operated switches so as to be energised whenever the throttle is moved into said minimum speed range.

14. In an aircraft, in combination, an airframe structure, a jet propulsion engine mounted in said airframe structure, said engine having a power control throttle and comprising a jet pipe also mounted in said airframe structure, valve means in said jet pipe for deflecting the jet stream out of said jet pipe, said valve means comprising a plurality of impervious valve members hinged about axes lying in a plane normal to the long axis of the jet pipe, the hinge axis of each valve member crossing the jet pipe and intersecting the wall of the jet pipe at two points, each valve member extending at all times substantially wholly on the side of its hinge axis adjacent the upstream end of the jet pipe and having an internal surface curved in cross-section, each valve member being movable about its hinge axis between an open position in which its internal surface forms a faired continuation of the internal surface of the wall of the jet pipe and a closed position in which it extends into the jet pipe, each valve member having a first peripheral edge part which remains at all times substantially contiguous with the internal surface of the wall of the jet pipe, said first peripheral edge parts of all the valve members together extending substantially around the whole of the periphery of the cross-section of the jet pipe and a second peripheral edge part, said second peripheral edge parts in the closed position of the valve members, butting together and forming a closure across the jet pipe, and valve member moving jack operatively connected to said valve members for moving said valve members between their open and closed positions, said jet pipe having an opening in its wall, which opening is closed by one of said valve members when said one of said valve members is in its open position, an airframe skin part on said airframe structure adjacent said opening in the wall of said jet pipe, said skin part having an opening, a flush-fitting closure member for said skin part opening carried from said airframe structure, closure member moving jack connected between said closure member and said airframe structure for moving said closure member between a closed position in which said skin part opening is open, said closure member having when in its open position at least its foremost part spaced away from said skin part and extending into the relative airstream over said skin part, deflector means movable between an inoperative position in which it lies wholly between the wall of said jet pipe and said skin part, and an operative position in which one end of the deflector means receives exhaust gases of the jet stream flowing out of the jet pipe through said opening in the wall of the jet pipe and the other end of said deflector means projects through said skin part opening to direct the exhaust gases clear of the relative airstream over the outer surface of said skin, said deflector means comprising a first deflector on the inner surface of said closure member, and a second deflector on the outer surface of said one of said valve members, said deflectors forming a continuation one of the other when said closure member is moved to its open position and said one of said valve members is moved to its closed position, said combination further comprising a source of power for said jacks, conduit means between said jacks and said power source interlock means in operative connection with said valve member moving jack for preventing the operation of said valve member moving jack to move said valve members from their open position to their closed position when said closure member is in its closed position and control means in operative connection with said throttle and actuated by movement of said throttle in one direction into a minimum power range to initiate the operation of said closure member moving jack to move said closure member from its closed position to its open position and then the operation of said valve member moving jack to move said valve members from their open position to their closed position, and by movement of said throttle in the reverse direction into said minimum power range to initiate the operation of said valve member moving jack to move said valve members from their closed position to their open position, and then the operation of said closure member moving jack to move said closure member from its open position to its closed position, said control means comprising a pair of pressure fluid relay valves in said conduit means, one of which relay valves is operated when said closure member reaches its open position to communicate pressure fluid to the valve member moving jack to move said valve members to their closed position, and the other of which relay valves is operated when said valve members reach their open position to communicate pressure fluid to the closure member moving jack to move said closure member to its closed position.

15. The combination of claim 14 wherein said one of said relay valves is operated by the relative movement between the elements of the closure member moving jack and said other of said relay valves is operated by the relative movement of the elements of the valve member moving jack.

16. The combination of claim 15, wherein said valve member moving jack has one of its elements connected to one of said valve members, and the other of its elements connected to the other of said valve members, and said other of said relay valves is carried by one of these elements.

17. The combination of claim 8 wherein the jet pipe has two openings in its wall each closed by a different one of said valve members when the valve members are in their open position, and said skin part has two openings each of which is normally closed by a different one of a pair of said closure members, and a pair of said deflector means is provided one associated with each of said skin openings, and said closure member moving jack is connected to move both said closure members together, said closure member moving jack having one of its elements connected to one of said closure members, and the other of its elements connected to the other of said closure members, and wherein said one of said relay valves is carried by one of the elements of the closure member moving jack to be operated on relative movement of the elements of said closure member moving jack.

References Cited in the file of this patent
UNITED STATES PATENTS

| | | |
|---|---|---|
| 2,024,274 | Campini | Dec. 17, 1935 |
| 2,510,506 | Lindhagen et al. | June 6, 1950 |
| 2,584,038 | Morrison | Jan. 29, 1952 |
| 2,620,623 | Imbert | Dec. 9, 1952 |
| 2,630,990 | Kanode et al. | Mar. 10, 1953 |
| 2,637,164 | Robson et al. | May 5, 1953 |
| 2,681,548 | Kappus | June 22, 1954 |
| 2,774,554 | Ashwood et al. | Dec. 18, 1956 |
| 2,780,058 | Beale et al. | Feb. 5, 1957 |